(12) United States Patent
Ishimatsu

(10) Patent No.: US 8,746,890 B2
(45) Date of Patent: Jun. 10, 2014

(54) POLARIZATION BEAM SPLITTING ELEMENT AND IMAGE PROJECTION APPARATUS

(75) Inventor: Rie Ishimatsu, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 253 days.

(21) Appl. No.: 13/435,261

(22) Filed: Mar. 30, 2012

(65) Prior Publication Data

US 2012/0249970 A1 Oct. 4, 2012

(30) Foreign Application Priority Data

Mar. 31, 2011 (JP) ................................ 2011-077067

(51) Int. Cl.
*G03B 21/14* (2006.01)

(52) U.S. Cl.
USPC ................... 353/20; 353/30; 353/31; 353/34; 353/37; 353/85; 359/485.01; 359/485.02; 359/485.05; 362/19; 349/7; 349/9

(58) Field of Classification Search
USPC ............... 353/20, 30, 31, 33, 34, 37, 85, 122; 359/485.01, 485.02, 485.05, 487.01, 359/489.01, 489.08, 189.15, 489.06, 359/487.05, 487.06; 349/5–10, 18, 96; 362/19
See application file for complete search history.

(56) References Cited

U.S. PATENT DOCUMENTS

| | | | | |
|---|---|---|---|---|
| 5,748,368 A | * | 5/1998 | Tamada et al. | 359/485.03 |
| 2004/0120041 A1 | * | 6/2004 | Silverstein et al. | 359/486 |
| 2010/0302481 A1 | * | 12/2010 | Baum et al. | 349/96 |

FOREIGN PATENT DOCUMENTS

| | | |
|---|---|---|
| WO | 00/79317 A1 | 12/2000 |
| WO | 01/51964 A1 | 7/2001 |

* cited by examiner

*Primary Examiner* — Sultan Chowdhury
(74) *Attorney, Agent, or Firm* — Rossi, Kimms & McDowell LLP

(57) ABSTRACT

The polarization beam splitting element includes a one-dimensional grating structure having a grating period smaller than a wavelength of an entering beam and including a metal grating portion, and two light-transmissive members each having a refractive index higher than that of air. The one-dimensional grating structure is disposed between the two light-transmissive members. The grating period of the one-dimensional grating structure is 120 nm or less, a thickness of the one-dimensional grating structure is 100 nm or less and an inter-grating portion of the one-dimensional grating structure is formed as a vacuum space or formed of air or a dielectric material. The grating period $\Lambda$ [nm], a filling factor FF that is a ratio $w/\Lambda$ of a width $w$ [nm] of the grating portion to the grating period, a refractive index $n_a$ of the inter-grating portion and a wavelength $\lambda_g$ of 550 [nm] satisfy $(1.4n_a-2.9)\Lambda/\lambda_g-0.57n_a+1.32 \leq FF \leq (1.4n_a-2.9)\Lambda/\lambda_g-0.57n_a+1.39$ and $0.152n_p-1.375(\Lambda/\lambda_g)+0.5 \leq FF \leq 0.152n_p-1.375(\Lambda/\lambda_g)+0.6$.

6 Claims, 12 Drawing Sheets

POLARIZATION BEAM SPLITTING ELEMENT AND IMAGE PROJECTION APPARATUS

BACKGROUND OF THE INVENTION

1. Field of the Invention

The present invention relates to a polarization beam splitting element that splits an entering beam according to polarization directions, and particularly to a polarization beam splitting element that is constituted by a wire grid (one-dimensional grating structure) having a grating period smaller than a wavelength of the entering beam.

2. Description of the Related Art

A wire grid that is a one-dimensional grating structure formed of a metal and having a grating period smaller than a wavelength (also referred to as a "use wavelength") of an entering beam has a function of splitting beams whose polarization directions are mutually different. Japanese Patent Laid-Open No. 2003-502708 discloses a wire grid having a visible wavelength-order minute grating period and formed on a substrate.

Such a wire grid reflects polarized light (first polarized light) whose electric field oscillates in a plane including a grid longitudinal direction and transmits light (second polarized light) whose electric field oscillates in a direction perpendicular to that plane.

Moreover, Japanese Patent Laid-Open No. 2003-519818 discloses a wire grid polarization beam splitting element that is used by being sandwiched between transparent substrates such as prisms, for the purpose of suppressing generation of astigmatism at the substrate and of improving handling easiness of grating.

However, the wire grid requires increase of a grating thickness thereof in order to achieve a sufficient polarization splitting function, which causes the wire grid to absorb the second polarized light to be transmitted and thereby reduces transmittance for the second polarized light.

Furthermore, the wire grid polarization beam splitting element sandwiched between the transparent substrates such as the prisms tends to have low optical performance for the second polarized light, that is, has a higher reflectance for the second polarized light as compared with a case where an air space or a vacuum space is formed on a beam entrance side of the wire grid. Thus, using such a wire grid polarization beam splitting element for color separation in an image projection apparatus makes it impossible to use a same optical path for respective colors, which increases cost of the apparatus and makes it difficult to miniaturize the apparatus.

SUMMARY OF THE INVENTION

The present invention provides a polarization beam splitting element capable of improving transmittance for the second polarized light while keeping high reflectance for the first polarized light, and provides an image projection apparatus using the polarization beam splitting element.

The present invention provides as one aspect thereof a polarization beam splitting element configured to split an entering beam in a visible wavelength range according to polarization directions. The polarization beam splitting element includes a one-dimensional grating structure having a grating period smaller than a wavelength of the entering beam and including a grating portion formed of a metal, and two light-transmissive members each having a refractive index higher than that of air and each being formed of a light-transmissive material. The one-dimensional grating structure is disposed between the two light-transmissive members. The grating period of the one-dimensional grating structure is 120 nm or less, a thickness of the one-dimensional grating structure is 100 nm or less and an inter-grating portion of the one-dimensional grating structure is formed as a vacuum space or formed of air or a dielectric material. The grating period $\Lambda$ [nm], a filling factor FF that is a ratio $w/\Lambda$ of a width $w$ [nm] of the grating portion to the grating period, a refractive index $n_a$ of the inter-grating portion and a wavelength $\lambda_g$ of 550 [nm] satisfy the following conditions:

$$(1.4n_a-2.9)\Lambda/\lambda_g-0.57n_a+1.32 \leq FF \leq (1.4n_a-2.9)\Lambda/\lambda_g-0.57n_a+1.39$$

$$0.152n_p-1.375(\Lambda/\lambda_g)+0.5 \leq FF \leq 0.152n_p-1.375(\Lambda/\lambda_g)+0.6.$$

The present invention provides as another aspect thereof an image projection apparatus including a color separation optical system or a color separation/combination optical system using the above polarization beam splitting element.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

First of all, prior to description of specific embodiments, a configuration of a polarization beam splitting element that is a representative embodiment of the present invention will be described with reference to FIGS. 1 and 2.

Figure 1:
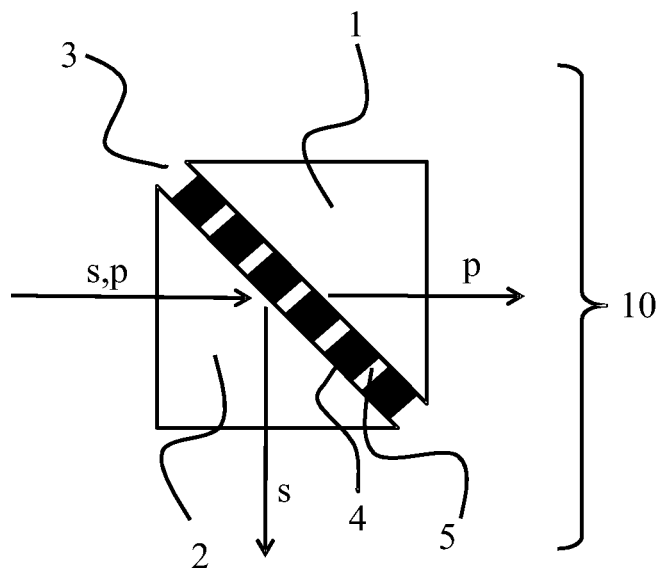
FIG. 1 shows a configuration of a polarization beam splitting element that is a representative embodiment of the present invention.

FIG. 1 shows a configuration of a polarization beam splitting element 10 that is a representative embodiment of the present invention. The polarization beam splitting element 10 is constituted by two prisms 1 and 2 that are light transmissive members formed of a material having a light transmissive property and a polarization beam splitting part 3 disposed between the prisms 1 and 2.

Figure 2:
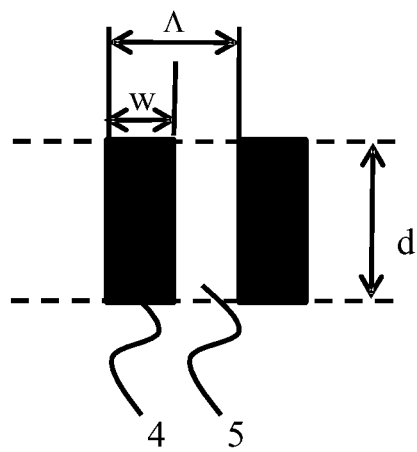
FIG. 2 is an enlarged view of a configuration of a polarization beam splitting part of the polarization beam splitting element shown in FIG. 1.

The polarized beam splitting part 3 is constituted by, as shown in FIG. 2 as an enlarged view, a wire grid in which grating portions 4 and inter-grating portions 5 that are portions between the grating portions 4 are alternately disposed. The wire grid is a one-dimensional grating structure in which the grating portions 4 are formed of a metal and have a grating period smaller than a wavelength of an entering beam (entering light). The inter-grating portion 5 is formed as a vacuum space, or formed of air or a dielectric material. In FIG. 1, a longitudinal direction of the grating portions 4 and inter-grating portions 5 extends in a direction perpendicular to a paper of FIG. 1.

Figures 15A, 15B:
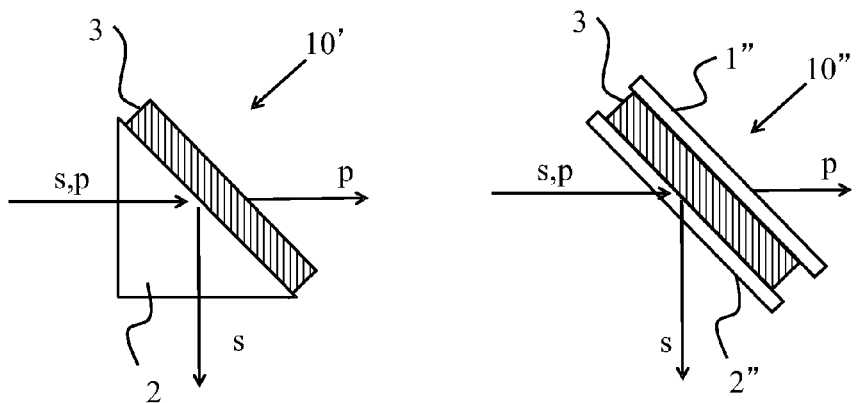
FIGS. 15A and 15B show modified embodiments of the present invention.

Although this embodiment treats the polarization beam splitting part 3 and the prisms 1 and sandwiching the polarization beam splitting part 3 collectively as the polarization beam splitting element 10, the prisms 1 and 2 are not necessarily needed for the polarization beam splitting element. For example, as shown in FIG. 15A a polarization beam splitting element 10' may be constituted only by the prism 2 and the polarization beam splitting part 3, and as shown in FIG. 15B a polarization beam splitting element 10" may be constituted by disposing the polarization beam splitting part 3 between two planar substrates 1" and 2" having a light transmissive property.

The entering beam, which is non-polarized light including an s-polarized light component (hereinafter simply referred to as "s-polarized light") as a first polarization light component and a p-polarized light component (hereinafter simply referred to as "p-polarized light") as a second polarized light component, is transmitted through the prism 2 to enter the polarization beam splitting part 3. In the following description, a plane including an axis extending in a representative entrance direction of the entering beam (that is, an optical axis of an optical system including the polarization beam splitting element 10 or a virtual axis corresponding to the optical axis) and a normal to an entrance/exit surface of the polarization beam splitting part 3 is referred to as "an entrance plane". Light whose electric field oscillates in a direction along the entrance plane corresponds to the p-polarized light, and light whose electric field oscillates in a direction perpendicular to the entrance plane corresponds to the s-polarized light. Description of this and other embodiments will be made on an assumption that an azimuth of the entering beam is 0 degree.

The polarization beam splitting part 3 reflects the s-polarized light of the entering beam and transmits the p-polarized light thereof by its polarization splitting function. The s-polarized light reflected by the polarization beam splitting part 3 is transmitted through the prism 2 to exit from the polarization beam splitting element 10, and the p-polarized light transmitted through the polarization beam splitting part 3 is transmitted through the prism 1 to exit from the polarization beam splitting element 10. A wavelength of the entering beam, that is, a use wavelength is whole or part of a visible wavelength range of 430-680 nm (or 400-700 nm).

This embodiment will elucidate that the wire grid has mutually different periodic dependencies of reflectance and transmittance for the s-polarized light and the p-polarized light. The reflectance and transmittance of the wire grid for the s-polarized light is less influenced by the grating period, but significantly depends on a filling factor and a grating thickness (thickness of the wire grid). The reflectance for the s-polarized light is increased and the transmittance therefor is decreased as the filling factor and the grating thickness increase. The transmittance for the s-polarized light significantly influences an extinction ratio, so that suppression of transmission of the s-polarized light requires a sufficient grating thickness. Thus, decision of the filling factor automatically decides the grating thickness.

On the other hand, the reflectance and transmittance of the wire grid for the p-polarized light are more easily influenced by the grating period as compared with those for the s-polarized light, that is, the reflectance and transmittance of the wire grid for the p-polarized light significantly depend not only on the filling factor and the grating thickness, but also on the grating period. When the grating thickness is fixed, a shorter grating period provides, even though the filling factor is large, higher transmittance for the p-polarized light. When the grating period is fixed, a smaller grating thickness provides, even though the filling factor is large, higher transmittance for the p-polarized light. Therefore, shortening the grating period makes it possible to increase the filling factor without decreasing the transmittance for the p-polarized light. Increasing the filling factor can decrease the transmittance for the s-polarized light, which enables decrease of the grating thickness. Decreasing the grating thickness makes it possible to further increase the transmittance for the p-polarized light.

As understood from the above description, in order to keep high reflectance for the s-polarized light and to acquire good transmittance for the p-polarized light in the visible wavelength range, it is necessary that the grating period $\Lambda$ be 120 nm or less and the grating thickness d be 100 nm or less.

Moreover, the following embodiments will confirm that the reflectance Rp for the p-polarized light depends on the grating period $\Lambda$ and the filling factor FF under a condition that the grating period $\Lambda$ is 120 nm or less and the grating thickness d is 100 nm or less. The filling factor FF is defined as a ratio of the width w of the grating portion 4 (hereinafter referred to as "a grating width w") to the grating period $\Lambda$, that is, FF=w/$\Lambda$.

In particular, in order to suppress the reflectance Rp for the p-polarized light entering the polarization beam splitting part 3 at an incident angle of 45°, it is necessary that the filling factor FF satisfy the following condition (1) expressed by using the grating period $\Lambda$ [nm] and a refractive index $n_a$ of the inter-grating portion 5:

$$(1.4n_a-2.9)\Lambda/\lambda_g-0.57n_a+1.32 \leq FF \leq (1.4n_a-2.9)\Lambda/\lambda_g-0.57n_a+1.39 \quad (1)$$

where $\lambda_g$ is 550 nm.

A smaller filling factor FF than the left-hand side value of the condition (1) increases the transmittance Ts of the wire grid for the s-polarized light, which makes it impossible to provide a sufficient polarization splitting characteristic. Increasing the grating thickness d in order to decrease the transmittance Ts decreases the transmittance Tp for the p-polarized light, which makes it difficult to provide a sufficient transmission characteristic for the p-polarized light while keeping a good polarization splitting characteristic.

On the other hand, a larger filling factor FF than the right-hand side value of the condition (1) decreases the transmittance Tp of the wire grid for the p-polarized light. Decreasing the grating thickness d in order to increase the transmittance Tp increases the transmittance Ts for the s-polarized light, which makes it impossible to keep a good polarization splitting characteristic.

Moreover, in the case where the inter-grating portion 5 is formed as the vacuum space or is formed of the air, in order to suppress the reflectance Rp for the p-polarized light entering the polarization beam splitting part 3 at an incident angle of 45°, it is more desirable that the filling factor FF satisfy the following condition (2) expressed by using a refractive indexes $n_p$ of the prisms 1 and 2:

$$0.152n_p - 1.375(\Lambda/\lambda_g) + 0.5 \leq FF \leq 0.152n_p - 1.375(\Lambda/\lambda_g) + 0.6 \quad (2)$$

A lower filling factor FF than the left-hand side value of the condition (2) makes it difficult to provide a sufficient transmittance characteristic for the p-polarized light, as in the case where the filling factor FF is smaller than the left-hand side value of the condition (1). On the other hand, a larger filling factor FF than the right-hand side value of the condition (2) makes it impossible to keep a good polarization splitting characteristic, as in the case where the filling factor FF is larger than the right-hand side value of the condition (1).

Metal materials forming the grating portion 4 include aluminum, gold and silver. In particular, using the aluminum while satisfying the above condition (1) (more desirably, also satisfying the condition (2)) enables provision of good characteristics as shown in the following specific embodiments.

Description will hereinafter be made of the specific embodiments.

Embodiment 1

A polarization beam splitting element 10 that is a first embodiment (Embodiment 1) is constituted by prisms 1 and 2 having a refractive index n of 1.52 and a polarization beam splitting part 3 disposed between the prisms 1 and 2. The polarization beam splitting part 3 is constituted by grating portions 4 formed of aluminum and inter-grating portions 5 formed of air.

The polarization beam splitting part 3 in this embodiment has a grating period Λ of 50 nm, a grating width w of 31 nm, a grating thickness d of 45 nm and a filling factor FF of 0.62.

Figure 3A:
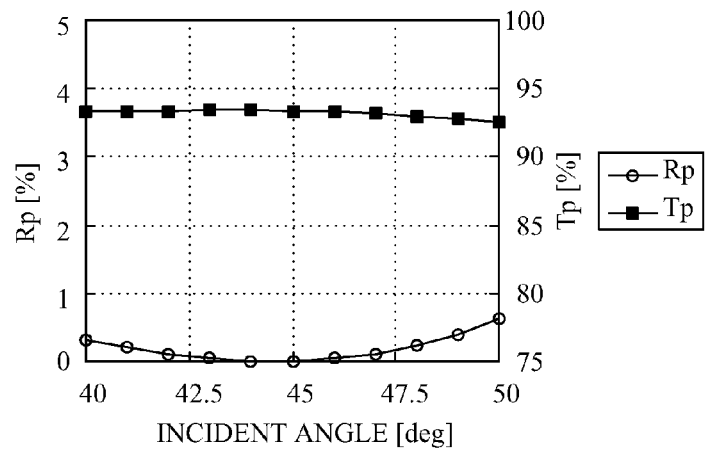
FIGS. 3A to 3C show characteristics of a polarization beam splitting element that is Embodiment 1 of the present invention.
Figure 3B:
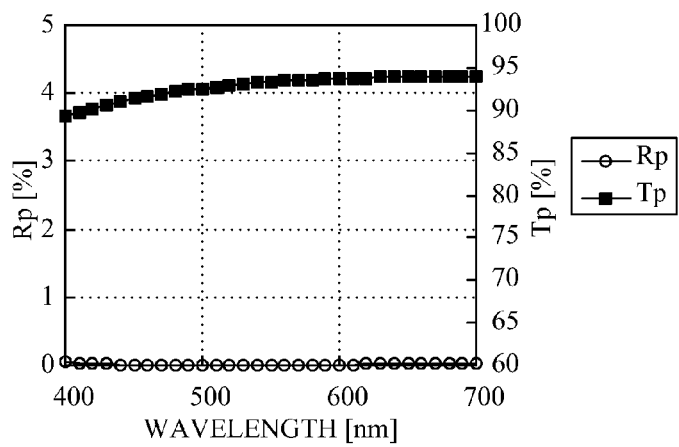
Figure 3C:
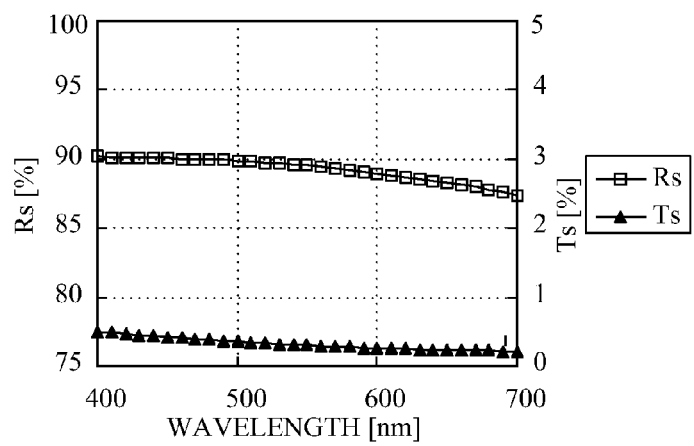

FIGS. 3A to 3C show characteristics of the polarization beam splitting element 10 (polarization beam splitting part 3) of this embodiment. FIG. 3A shows incident angle dependencies of reflectance Rp and transmittance Tp for p-polarized light of an entering beam whose wavelength is 550 nm. The incident angle is defined as an angle formed between a ray of the entering beam and a normal to (the entrance/exit surface of) the polarization beam splitting part 3 in the above-described entrance plane. This applies also to other embodiments described later. As shown in FIG. 3A, this embodiment is optimized such that the reflectance Rp for a p-polarized ray with an incident angle of 45° becomes lowest. The p-polarized ray with an incident angle of 45° is hereinafter referred to as "45°-incident p-polarized light", and an s-polarized ray with an incident angle of 45° is hereinafter referred to as "45°-incident s-polarized light".

FIG. 3B shows reflectance Rp and transmittance Tp for the 45°-incident p-polarized light at various wavelengths. FIG. 3C shows reflectance Rs and transmittance Ts for the 45°-incident s-polarized light at various wavelengths. As understood from FIGS. 3B and 3C, this embodiment provides Rp<0.1%, Tp>90%, Rs>85% and Ts<0.5% in a wavelength range of 430 nm-680 nm, which shows excellent characteristics.

Embodiment 2

A polarization beam splitting element 10 that is a second embodiment (Embodiment 2) is constituted by prisms 1 and 2 having a refractive index n of 1.52 and a polarization beam splitting part 3 disposed between the prisms 1 and 2. The polarization beam splitting part 3 is constituted by grating portions 4 formed of aluminum and inter-grating portions 5 formed of air.

The polarization beam splitting part 3 in this embodiment has a grating period Λ of 100 nm, a grating width w of 54 nm, a grating thickness d of 60 nm and a filling factor FF of 0.54.

Figure 4A:
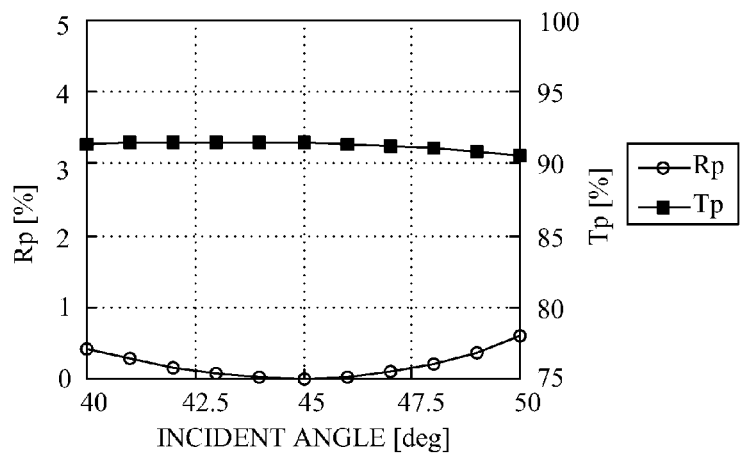
FIGS. 4A to 4C show characteristics of a polarization beam splitting element that is Embodiment 2 of the present invention.
Figure 4B:
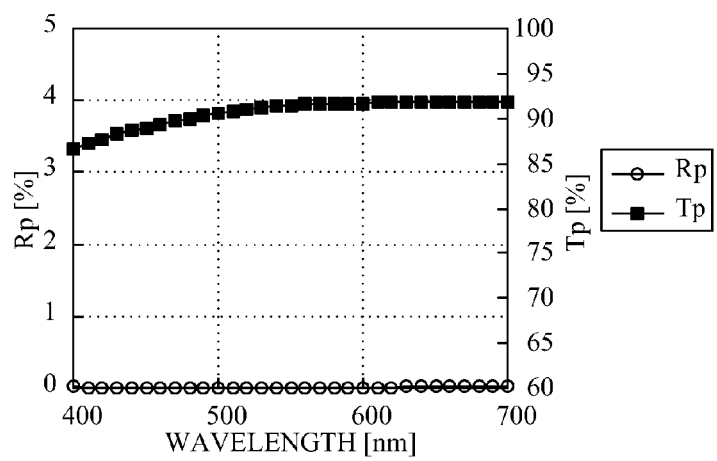
Figure 4C:
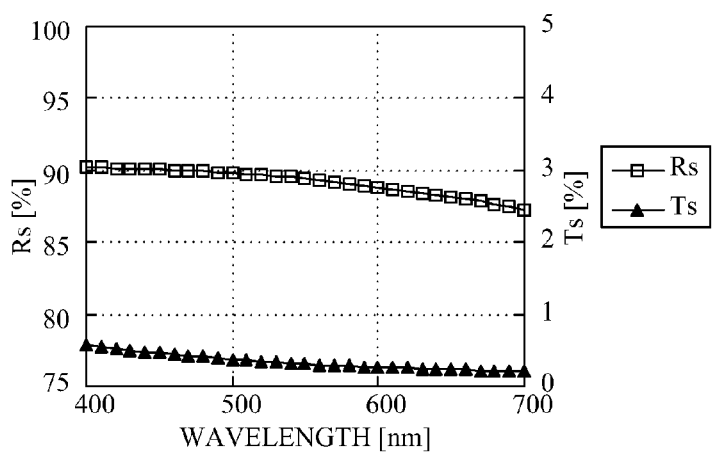

FIGS. 4A to 4C show characteristics of the polarization beam splitting element 10 (polarization beam splitting part 3) of this embodiment. FIG. 4A shows incident angle dependencies of reflectance Rp and transmittance Tp for p-polarized light of an entering beam whose wavelength is 550 nm. As shown in FIG. 4A, this embodiment is optimized such that the reflectance Rp for 45°-incident p-polarized light becomes lowest.

FIG. 4B shows reflectance Rp and transmittance Tp for the 45°-incident p-polarized light at various wavelengths. FIG. 4C shows reflectance Rs and transmittance Ts for 45°-incident s-polarized light at various wavelengths. As understood from FIGS. 4B and 4C, this embodiment provides Rp<0.1%, Tp>90%, Rs>85% and Ts<0.5% in a wavelength range of 430 nm-680 nm, which shows excellent characteristics.

Embodiment 3

A polarization beam splitting element 10 that is a third embodiment (Embodiment 3) is constituted by prisms 1 and 2 having a refractive index n of 1.52 and a polarization beam splitting part 3 disposed between the prisms 1 and 2. The polarization beam splitting part 3 is constituted by grating portions 4 formed of aluminum and inter-grating portions 5 formed of air.

The polarization beam splitting part 3 in this embodiment has a grating period Λ of 10 nm, a grating width w of 7.5 nm, a grating thickness d of 40 nm and a filling factor FF of 0.75.

Figure 5A:
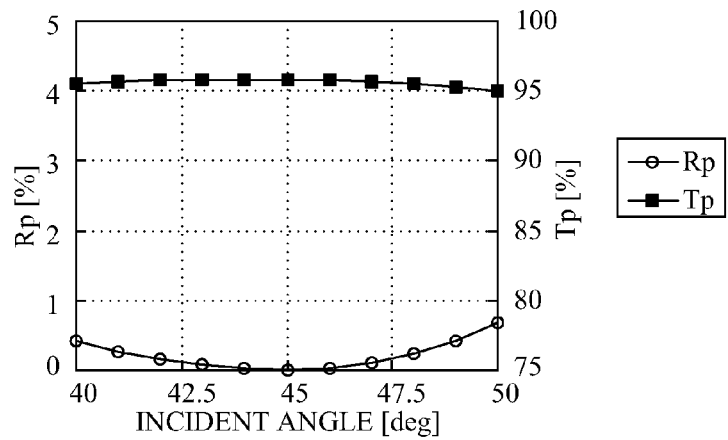
FIGS. 5A to 5C show characteristics of a polarization beam splitting element that is Embodiment 3 of the present invention.
Figure 5B:
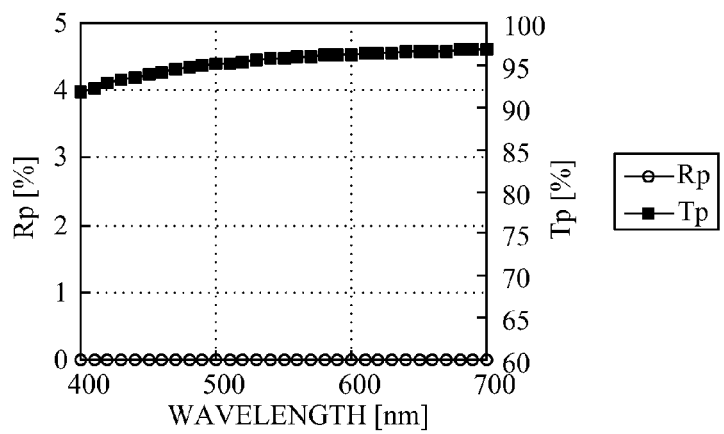
Figure 5C:
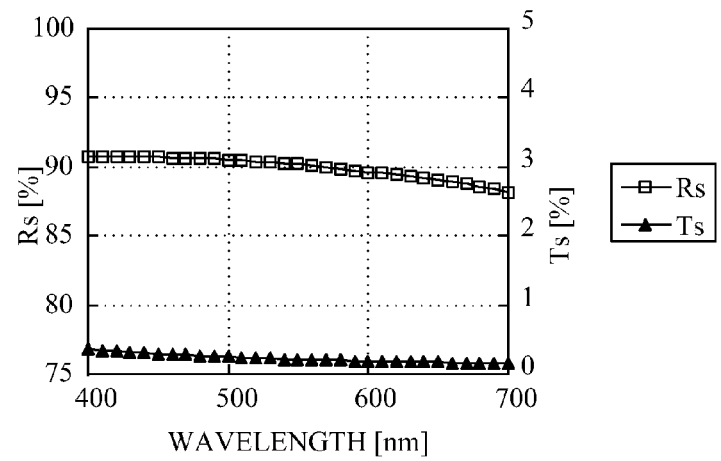

FIGS. 5A to 5C show characteristics of the polarization beam splitting element 10 (polarization beam splitting part 3) of this embodiment. FIG. 5A shows incident angle dependencies of reflectance Rp and transmittance Tp for p-polarized light of an entering beam whose wavelength is 550 nm. As shown in FIG. 5A, this embodiment is optimized such that the reflectance Rp for 45°-incident p-polarized light becomes lowest.

FIG. 5B shows reflectance Rp and transmittance Tp for the 45°-incident p-polarized light at various wavelengths. FIG. 5C shows reflectance Rs and transmittance Ts for 45°-incident s-polarized light at various wavelengths. As understood from FIGS. 5B and 5C, this embodiment provides Rp<0.1%, Tp>90%, Rs>85% and Ts<0.5% in a wavelength range of 430 nm-680 nm, which shows excellent characteristics.

Embodiment 4

A polarization beam splitting element 10 that is a fourth embodiment (Embodiment 4) is constituted by prisms 1 and 2 having a refractive index n of 1.8 and a polarization beam splitting part 3 disposed between the prisms 1 and 2. The polarization beam splitting part 3 is constituted by grating portions 4 formed of aluminum and inter-grating portions 5 formed of air.

The polarization beam splitting part 3 in this embodiment has a grating period Λ of 40 nm, a grating width w of 28 nm, a grating thickness d of 40 nm and a filling factor FF of 0.7.

Figure 6A:
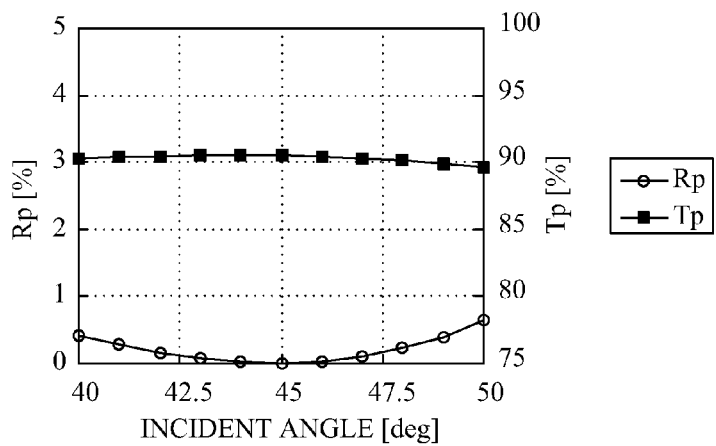
FIGS. 6A to 6C show characteristics of a polarization beam splitting element that is Embodiment 4 of the present invention.
Figure 6B:
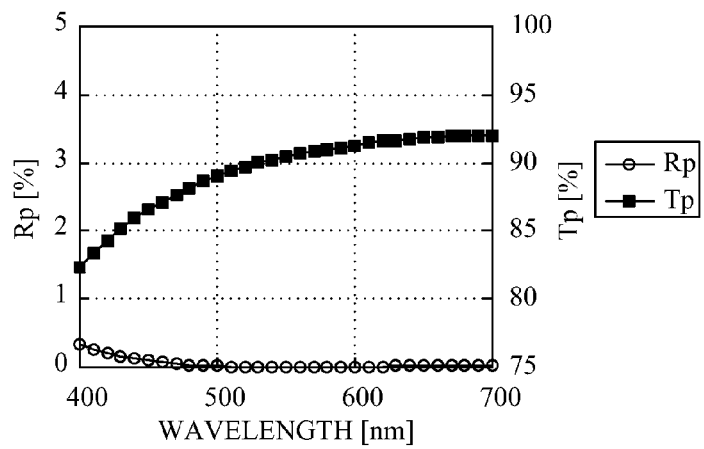
Figure 6C:
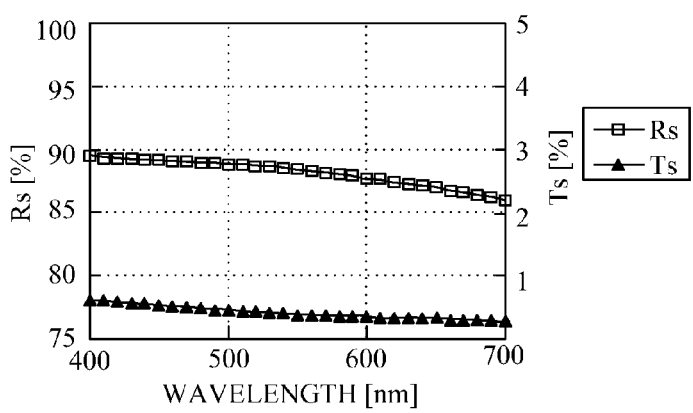
Figure 7:
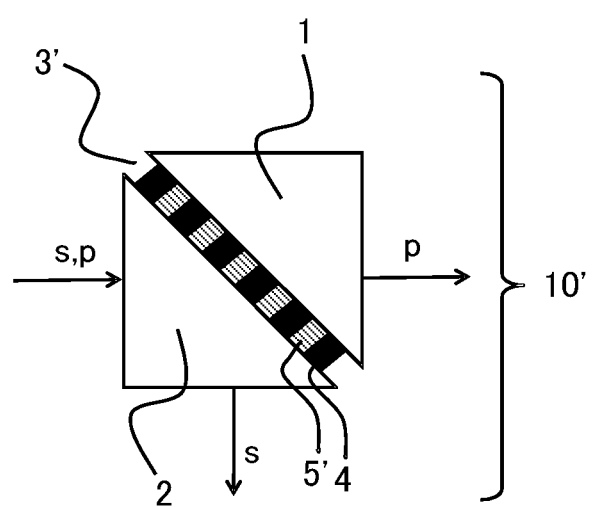
FIG. 7 shows a configuration of a polarization beam splitting element that is Embodiment 5 of the present invention.

FIGS. 6A to 6C show characteristics of the polarization beam splitting element 10 (polarization beam splitting part 3) of this embodiment. FIG. 6A shows incident angle dependencies of reflectance Rp and transmittance Tp for p-polarized light of an entering beam whose wavelength is 550 nm. As shown in FIG. 6A, this embodiment is optimized such that the reflectance Rp for 45°-incident p-polarized light becomes lowest.

FIG. 6B shows reflectance Rp and transmittance Tp for the 45°-incident p-polarized light at various wavelengths. FIG. 6C shows reflectance Rs and transmittance Ts for 45°-incident s-polarized light at various wavelengths. As understood from FIGS. 6B and 6C, this embodiment provides Rp<0.3%, Tp>85%, Rs>85% and Ts<0.6% in a wavelength range of 430 nm-680 nm, which shows excellent characteristics.

Comparative Examples 1 to 3 are shown below in order to elucidate the feature of the polarization beam splitting elements of the above embodiments. Polarization beam splitting elements of Comparative Examples 1 to 3 are each constituted by prisms and a polarization beam splitting part disposed between the prisms, as well as the above embodiments.

Comparative Example 1

Figure 12:
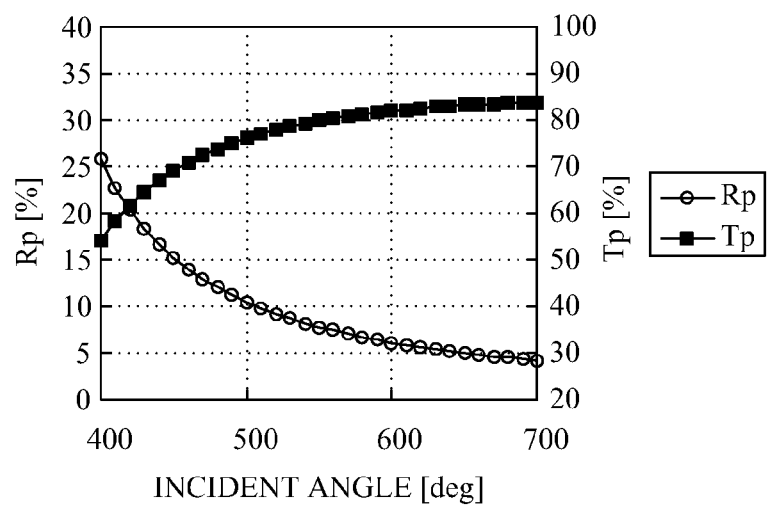
FIG. 12 shows characteristics of a polarization beam splitting element that is Comparative example 1.

FIG. 12 shows reflectance Rp and transmittance Tp of a polarization beam splitting element that is a first comparative example (Comparative Example 1) for 45°-incident p-polarized light at various wavelengths. In this comparative example, the prisms have a refractive index n of 1.52, and the polarization beam splitting part has a grating period Λ of 130 nm, a grating width w of 62.4 nm, a grating thickness d of 130 nm and a filling factor FF of 0.48.

As understood from FIG. 12, in this comparative example, the reflectance Rp for the 45°-incident p-polarized light increases as the wavelength thereof shortens, and reaches a high reflectance of about 10-25% in a wavelength range of 500 nm or less. Moreover, the transmittance Tp for the 45°-incident p-polarized light decreases as the wavelength thereof shortens, and falls to a transmittance of about 60-83% in a wavelength range of 430-680 nm.

Comparative Example 2

Figure 13A:
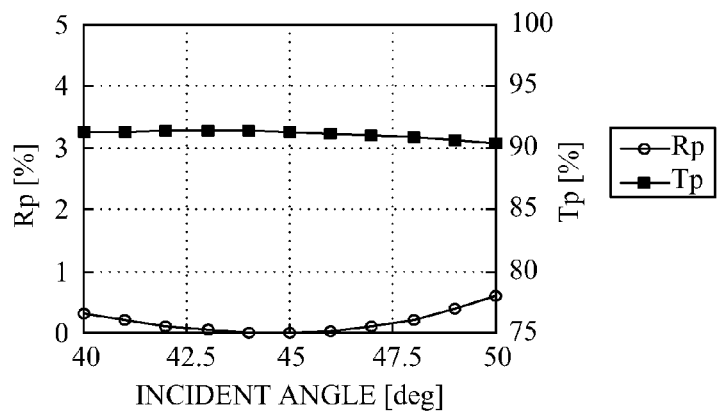
FIGS. 13A to 13C show characteristics of a polarization beam splitting element that is Comparative example 2.
Figure 13B:
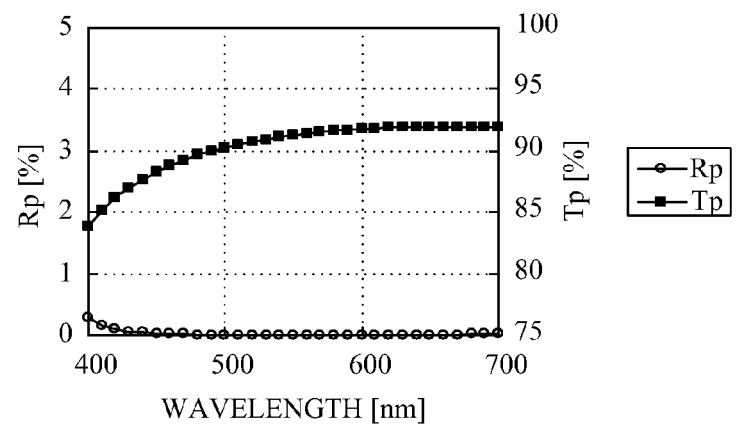
Figure 13C:
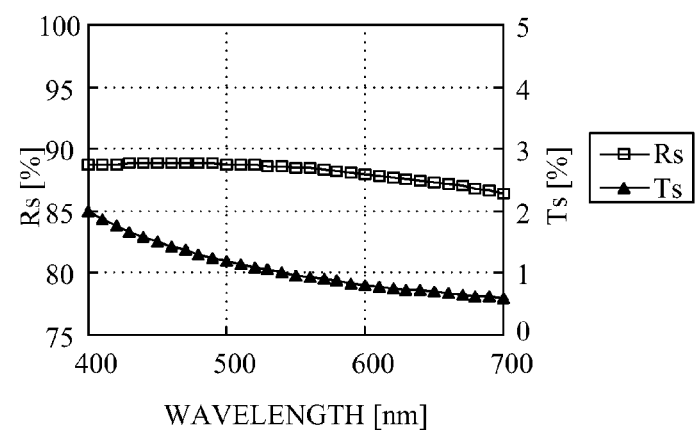

FIGS. 13A to 13C show characteristics of a polarization beam splitting element that is a second comparative example (Comparative Example 2). In this comparative example, the prisms have the same refractive index as that of Comparative Example 1, and the polarization beam splitting part has the same grating period, grating width and filling factor as those of Comparative Example 1. The polarization beam splitting part has a grating thickness d of 60 nm.

FIG. 13A shows incident angle dependencies of reflectance Rp and transmittance Tp for 45°-incident p-polarized light whose wavelength is 550 nm. FIG. 13B shows reflectance Rp and transmittance Tp for the 45°-incident p-polarized light at various wavelengths. FIG. 13C shows reflectance Rs and transmittance Ts for 45°-incident s-polarized light at various wavelengths.

As understood from FIGS. 13A and 13B, in this comparative example, the smaller grating thickness than that of Comparative Example 1 significantly improves the reflectance Rp and transmittance Tp for the p-polarized light. However, as understood from FIG. 13C, the transmittance Ts for the s-polarized light increases and exceeds 1% in a wavelength range of less than 540 nm, which makes it impossible to provide a sufficient polarization splitting characteristic in this wavelength range.

Thus, a small grating thickness with respect to a large grating period as in conventional polarization beam splitting elements increases the transmittance Ts for the s-polarized light. Although it is necessary for decreasing the transmittance Ts to increase the grating thickness, increasing the grating thickness decreases the transmittance Tp for the p-polarized light.

Accordingly, in order to keep high reflectance for the s-polarized light in a visible wavelength range of 430-680 nm and to provide good transmittance for the p-p\polarized light, it is necessary to set the grating period Λ to 120 nm or less and set the grating thickness to 100 nm or less.

Comparative Example 3

Figure 14A:
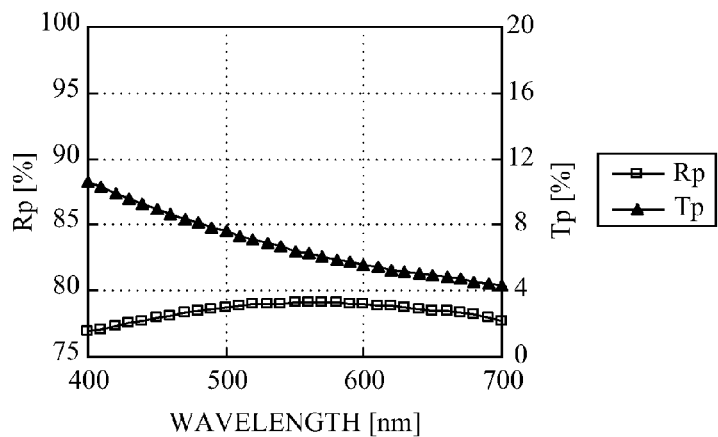
FIGS. 14A and 14B show characteristics of a polarization beam splitting element that is Comparative example 3.
Figure 14B:
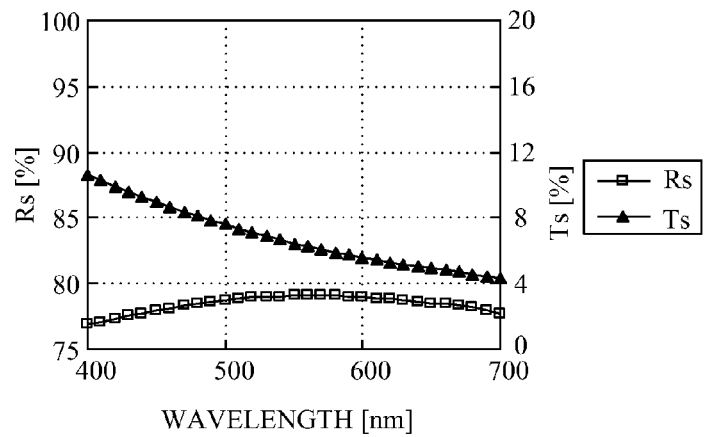

FIG. 14A shows reflectance Rp and transmittance Tp of a polarization beam splitting element that is a third comparative example (Comparative Example 3) for 45°-incident p-polarized light at various wavelengths. FIG. 14B shows reflectance Rs and transmittance Ts of the polarization beam splitting element of this comparative example for 45°-incident s-polarized light at various wavelengths.

In this comparative example, the prisms have a refractive index n of 1.52, and the polarization beam splitting part has a grating period Λ of 50 nm, a grating width w of 29 nm, a grating thickness d of 20 nm and a filling factor FF of 0.58.

As understood from FIG. 14A, this comparative example provides, for the p-polarized light, Rp>90% and Tp<1% in a wavelength range of 430 nm-680 nm. On the other hand, as understood from FIG. 14B, this comparative example provides, for the s-polarized light, Ts>4% and Rs<80%, which are low values. In order to improve the characteristics for the s-polarized light, it is necessary to increase the filling factor FF or the grating thickness d. However, even a larger filling factor FF than 0.9 cannot decrease the transmittance for the s-polarized light to 1% or less. Therefore, in order to provide good characteristics for both the p-polarized light and the s-polarized light, it is necessary that the grating thickness d be 30 nm or more.

Although Embodiments 1 to 4 described above employ the prisms 1 and 2 formed of materials whose refractive index n for all wavelengths is 1.52 or 1.8, a normal material having wavelength dispersion can be similarly used as the material of the prism. Moreover, materials having refractive indices other than 1.52 and 1.8 can be similarly used as the material of the prism. Furthermore, a gap may exist between the grating portions 4 and each of the prisms 1 and 2 for manufacturing reasons or the like.

Embodiment 5

A polarization beam splitting element 10' that is a fifth embodiment (Embodiment 5) is constituted by prisms 1 and 2 having a refractive index n of 1.52 and a polarization beam splitting part 3' disposed between the prisms 1 and 2. The polarization beam splitting part 3' is constituted by grating portions 4 formed of aluminum and inter-grating portions 5' formed of a dielectric material whose refractive index $n_a$ is 1.5.

The polarization beam splitting part 3' in this embodiment has a grating period Λ of 50 nm, a grating width w of 23 nm, a grating thickness d of 80 nm and a filling factor FF of 0.46.

Figure 8A:
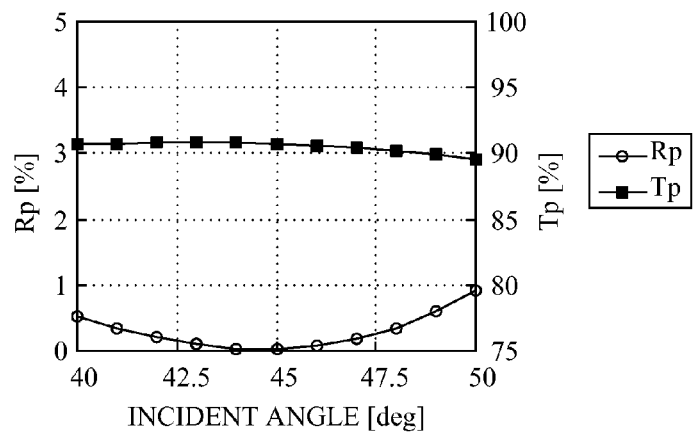
FIGS. 8A to 8C show characteristics of the polarization beam splitting element of Embodiment 5.
Figure 8B:
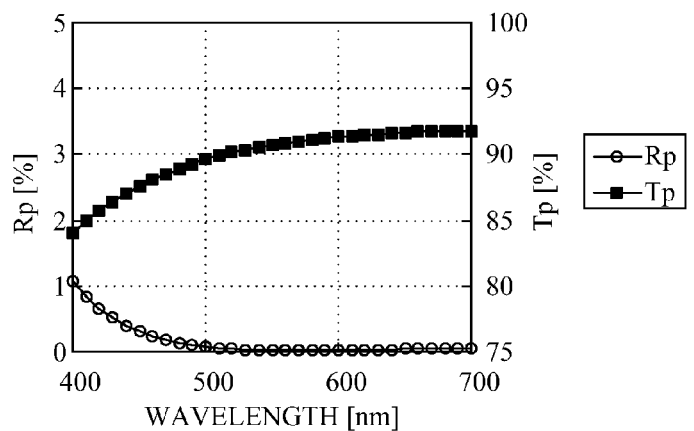
Figure 8C:
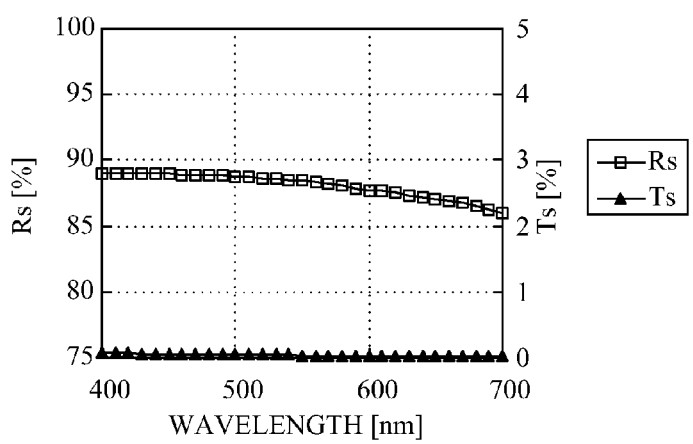

FIGS. 8A to 8C show characteristics of the polarization beam splitting element 10' (polarization beam splitting part 3') of this embodiment. FIG. 8A shows incident angle dependencies of reflectance Rp and transmittance Tp for p-polarized light of an entering beam whose wavelength is 550 nm. As shown in FIG. 8A, this embodiment is optimized such that the reflectance Rp for 45°-incident p-polarized light becomes lowest.

FIG. 8B shows reflectance Rp and transmittance Tp for the 45°-incident p-polarized light at various wavelengths. FIG. 8C shows reflectance Rs and transmittance Ts for 45°-incident s-polarized light at various wavelengths. As understood from FIGS. 8B and 8C, in this embodiment, forming the inter-grating portion 5' with the dielectric material provides a tendency that the characteristics for the p-polarized light in a short wavelength range decrease as compared with the case of not forming such a dielectric inter-grating portion 5'. However, this embodiment provides Rp<1.0%, Tp>85%, Rs>85% and Ts<0.2% in a wavelength range of 430 nm-680 nm, which shows excellent characteristics.

Embodiment 6

A polarization beam splitting element 10' that is a sixth embodiment (Embodiment 6) is constituted by prisms 1 and 2 having a refractive index n of 1.52 and a polarization beam splitting part 3' disposed between the prisms 1 and 2. The polarization beam splitting part 3' is constituted by grating portions 4 formed of aluminum and inter-grating portions 5' formed of a dielectric material whose refractive index $n_a$ is 1.46.

The polarization beam splitting part 3' in this embodiment has a grating period Λ of 50 nm, a grating width w of 23 nm, a grating thickness d of 60 nm and a filling factor FF of 0.46.

Figure 9A:
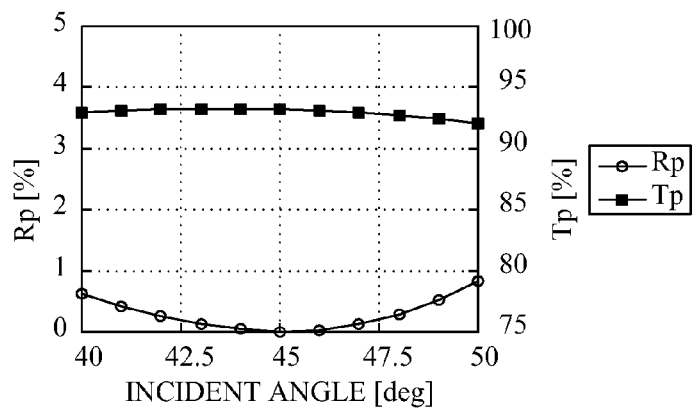
FIGS. 9A to 9C show characteristics of a polarization beam splitting element that is Embodiment 6 of the present invention.
Figure 9B:
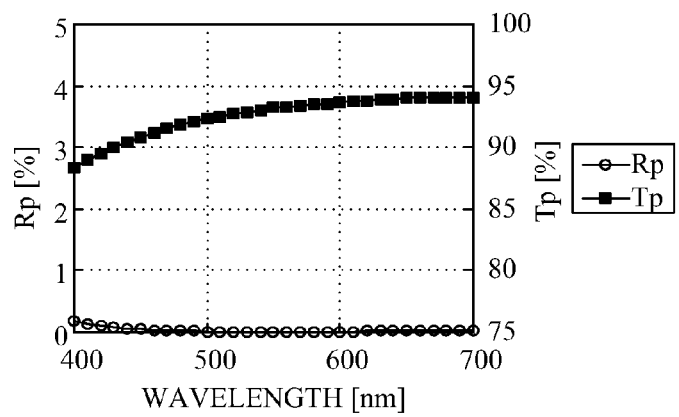
Figure 9C:
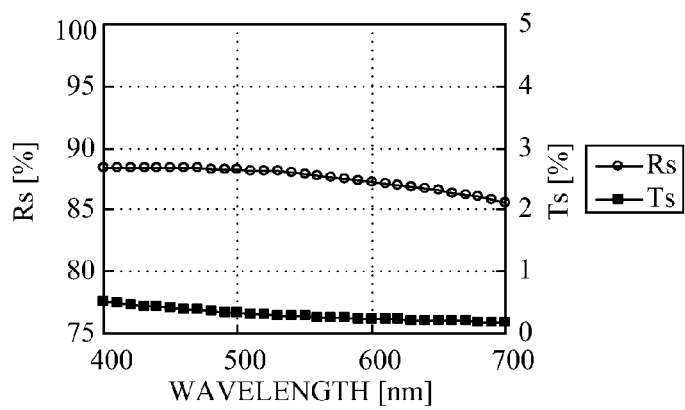

FIGS. 9A to 9C show characteristics of the polarization beam splitting element 10' (polarization beam splitting part 3') of this embodiment. FIG. 9A shows incident angle dependencies of reflectance Rp and transmittance Tp for p-polarized light of an entering beam whose wavelength is 550 nm. As shown in FIG. 9A, this embodiment is optimized such that the reflectance Rp for 45°-incident p-polarized light becomes lowest.

FIG. 9B shows reflectance Rp and transmittance Tp for the 45°-incident p-polarized light at various wavelengths. FIG. 9C shows reflectance Rs and transmittance Ts for 45°-incident s-polarized light at various wavelengths. As understood from FIGS. 9B and 9C, this embodiment provides Rp<0.2%, Tp>88%, Rs>85% and Ts<0.6% in a wavelength range of 430 nm-680 nm, which shows excellent characteristics.

Employing the configurations described in Embodiments 5 and 6 in which the inter-grating portions 5' are filled with a resin enables bonding of the polarization beam splitting part 3' with the prisms 1 and 2. This makes it easy to manufacture the polarization beam splitting element 10', and also increases strength of the polarization beam splitting element 10'.

Furthermore, a gap may exist between the grating portions 4 and each of the prisms 1 and 2 for manufacturing reasons or the like.

Embodiment 7

Figure 10:
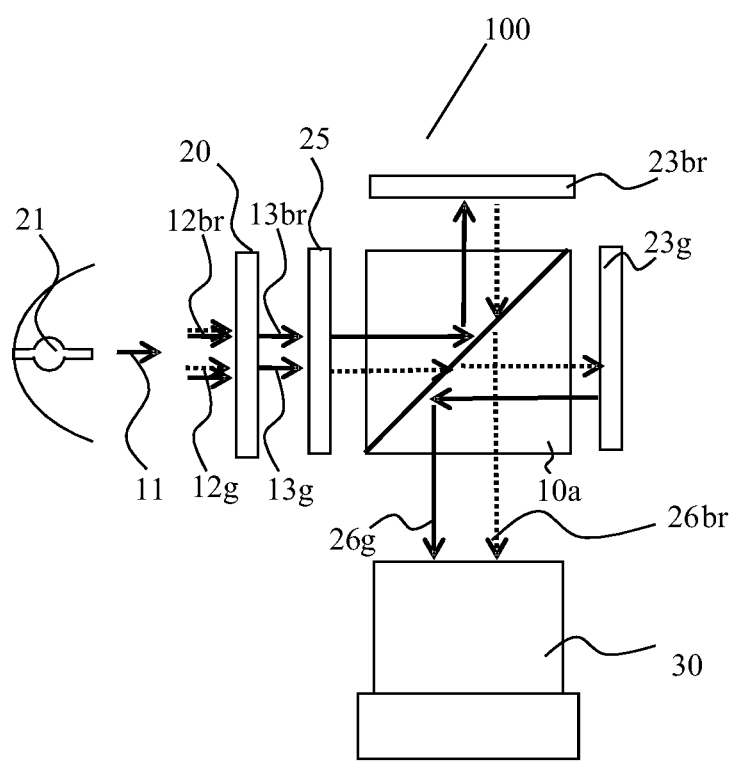
FIG. 10 shows a configuration of an image projection apparatus that is Embodiment 7 of the present invention.

FIG. 10 shows a configuration of an image projection apparatus (liquid crystal projector) that is a seventh embodiment of the present invention, the projector using any one of the polarization beam splitting elements 10 and 10' of Embodiments 1 to 6.

The image projection apparatus 100 includes a light source lamp 21, plural (two) reflective liquid crystal panels (light modulation elements) 23g and 23br, a projection lens (projection optical system) 30, a polarization conversion element 20, a wavelength selective phase difference plate 25 and a polarization beam splitter 10a corresponding to the polarization beam splitting element described in any one of Embodiments 1 to 6.

This embodiment separates, by the polarization beam splitter 10a included in a color separation/combination optical system (color separation optical system), white light emitted from the light source lamp 21 into plural color lights (green light and blue-red light) according to their polarization directions. The separated plural color lights are respectively introduced to and modulated by the reflective liquid crystal panels 23g and 23br. Then, the plural color lights modulated by the reflective liquid crystal panels 23g and 23br are combined with each other by the polarization beam splitter 10a and projected onto a projection surface through the projection lens 30.

A detailed description of optical effects of the image projection apparatus 100 will hereinafter be made. The white light emitted from the light source lamp 21 is converted into a collimated light flux 11 by an illumination optical system (not shown) to enter the polarization conversion element 20. FIG. 10 shows the white light as light in which the green light 12g and the blue-red light 12br are combined with each other.

The green light 12g and the blue-red light 12br are converted, by passing through the polarization conversion element 20, into s-polarized green light 13g and s-polarized blue-red light 13br, and then enter the wavelength selective phase difference plate 25. The wavelength selective phase difference plate 25 has a function of rotating the polarization direction of the s-polarized green light 13g by 90° without rotating the polarization direction of the s-polarized blue-red light 13br. Thereby, the green light 13g as p-polarized light and the blue-red light 13br as the s-polarized light without change enter the polarization beam splitter 10a.

The polarization beam splitter 10a transmits the p-polarized green light 13g and reflects the s-polarized blue-red light 13br. The green light 13g transmitted through the polarization beam splitter 10a enters the reflective liquid crystal panel 23g for green, and the blue-red light 13br reflected by the polarization beam splitter 10a enters the reflective liquid crystal panel 23br for blue and red.

The light entering each reflective liquid crystal panel is reflected thereby and converted into image light whose polarization direction is changed at each pixel according to image signals. Green image light 26g and blue-red image light 26br enter the polarization beam splitter 10a again: the green image light 26g is reflected thereby and the blue-red image light 26br is transmitted therethrough. The green image light 26g and the blue-red image light 26br thus combined is projected through the projection lens 30 onto the projection surface such as a screen.

The image projection apparatus 100 of this embodiment using the polarization beam splitter 10a corresponding to one of the polarization beam splitting elements 10 and 10' described in Embodiments 1 to 6 can project a good bright color image with high contrast. Moreover, the polarization beam splitter 10a provides low reflectance for the p-polarized light and low transmittance for the s-polarized light, which enables achievement of high contrast even if a same polarization beam splitting element is used for the polarized green light and the polarized blue-red light. Therefore, it is possible to use a same optical path configuration for the polarized green light and the polarized blue-red light, which enables achievement of a compact image projection apparatus without decreasing contrast, as compared with image projection apparatuses having an optical system that separates blue, green and red optical paths from one another.

Although this embodiment has described the case of separating the white light into the green light and the blue-red light by the polarization beam splitting element, other configurations may be employed depending on characteristics of the wavelength selective phase difference plate and liquid crystal panels. Moreover, although this embodiment has described the case of converting the light from the light source into the s-polarized light by the polarization conversion element, the light from the light source may be converted into p-polarized light.

Embodiment 8

Figure 11:
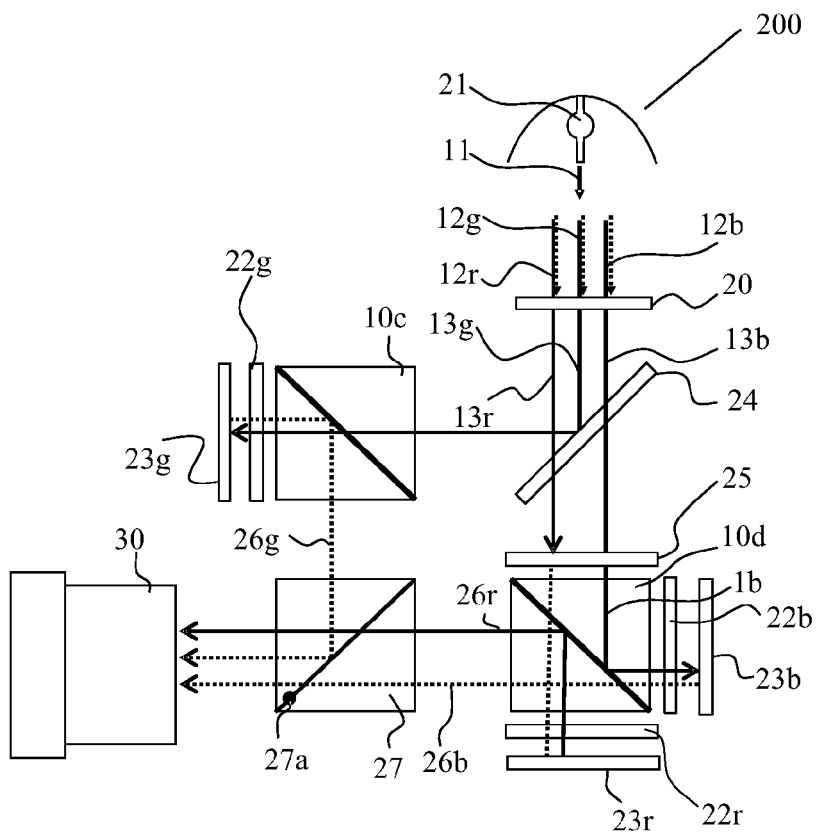
FIG. 11 shows a configuration of an image projection apparatus that is Embodiment 8 of the present invention.

FIG. 11 shows a configuration of an image projection apparatus (liquid crystal projector) that is an eighth embodiment of the present invention, the projector using any one of the polarization beam splitting elements 10 and 10' of Embodiments 1 to 6.

The image projection apparatus 200 includes a light source lamp 21, a polarization conversion element 20, a dichroic mirror (color separating element) 24, a wavelength selective phase difference plate 25 and first and second polarization beam splitters 10c and 10d each corresponding to the polarization beam splitting element described in any one of Embodiments 1 to 6. Moreover, the apparatus 200 includes a reflective liquid crystal panel (first light modulation element) 23g for green, a reflective liquid crystal panel (second light modulation element) 23b for blue and a reflective liquid crystal panel (third light modulation element) 23r for red. In addition, the apparatus 200 includes phase difference plates 22g, 22b and 22r, a color combining prism (color combining element) 27 and a projection lens (projection optical system) 30.

White light emitted from the light source lamp 21 is converted into a collimated light flux 11 by an illumination optical system (not shown) to enter the polarization conversion element 20. FIG. 11 shows the white light as light in which green light (first light) 12g, blue light (second light) 12b and red light (third light) 12r are combined with one another. The "first", "second" and "third" added to the color lights, the polarization beam splitters and the reflective liquid crystal panels are only to elucidate the description thereof, that is, the "first", "second" and "third" do not mean only green, blue and red, respectively.

The green light 12g, blue light 12b and red light 12r entering the polarization conversion element 20 are entirely converted into s-polarized light by the polarization conversion element 20, and thereby s-polarized green light 13g s-polarized blue light 13b and s-polarized red light 13r are produced. These s-polarized lights 13g, 13b and 13r enter the dichroic mirror 24.

The dichroic mirror 24 reflects only green light, and transmits red light and blue light. Thus, the s-polarized green light 13g is separated from the s-polarized blue light 13b and the s-polarized red light 13r.

The s-polarized green light 13g reflected by the dichroic mirror 24 enters the first polarization beam splitter 10c to be reflected thereby, passes through the phase difference plate 22g, and then enters the reflective liquid crystal panel 23g for green.

On the other hand, the s-polarized blue light 13b and s-polarized red light 13r transmitted through the dichroic mirror 24 enter the wavelength selective phase difference plate 25.

The wavelength selective phase difference plate 25 rotates only a polarization direction of the s-polarized red light 13r by 90° without rotating a polarization direction of the s-polarized blue light 13b. Thus, the blue light 13b as the s-polarized light without change and the red light 13r as p-polarized light enter the second polarization beam splitter 10d.

The s-polarized blue light 13b is reflected by the second polarization beam splitter 10d, passes through the phase difference plate 22b, and then enters the reflective liquid crystal panel 23b for blue. The p-polarized red light 13r is transmitted through the second polarization beam splitter 10d, passes through the phase difference plate 22r, and then enters the reflective liquid crystal panel 23r for red.

Each light entering each reflective liquid crystal panel is reflected thereby and converted into image light whose polarization direction is changed at each pixel according to image signals. Each phase difference plate corrects a phase shift generated at the polarization beam splitter and the reflective liquid crystal panel to reduce so-called leakage light.

Green image light 26g passes through the phase difference plate 22g again, and then is reflected by the first polarization beam splitter 10c to enter the color combining prism 27. Blue image light 26b passes through the phase difference plate 22b again, and then is transmitted through the second polarization beam splitter 10d to enter the color combining prism 27. Red image light 26r passes through the phase difference plate 22r again, and then is reflected by the second polarization beam splitter 10d to enter the color combining prism 27.

The color combining prism 27 reflects the green image light 26g by its dichroic film 27a and transmits the blue image light 26b and the red image light 26r to combine these image lights 26g, 26b and 26r. The combined image lights 26g, 26b and 26r are projected onto a projection surface such as a screen through the projection lens 30.

The image projection apparatus 200 of this embodiment using the first and second polarization beam splitters 10c and 10d each corresponding to one of the polarization beam splitting elements 10 and 10' described in Embodiments 1 to 6 can project a bright good color image with high contrast. However, it is not necessarily needed to use the polarization beam splitting element 10 or 10' as both the first and second polarization beam splitters 10c and 10d, it is only necessary to use the polarization beam splitting element 10 or 10' as at least the second polarization beam splitter 10d. Moreover, the first and second polarization beam splitters 10c and 10d provide low reflectance for the p-polarized light and low transmittance for the s-polarized light, which enables achievement of high contrast even if a same polarization beam splitting element is used for the polarized blue light and the polarized red light. Therefore, it is possible to use a same optical path configuration for the polarized blue light and the polarized red light, which enables achievement of a compact image projection apparatus without decreasing contrast, as compared with image projection apparatuses having an optical system that separates blue, green and red optical paths from one another.

Although this embodiment has described the case of converting the light from the light source into the s-polarized light by the polarization conversion element, the light from the light source may be converted into p-polarized light. Moreover, although this embodiment has described the case of first separating the white light into the green light and the blue-red light by the dichroic mirror, other color separation may be performed depending on characteristics of the dichroic mirror, the color combining prism and the like.

Table 1 shows relationships between the conditions (1) and (2) and the polarization beam splitting elements 10 and 10' of Embodiments 1 to 6 and relationships between the conditions (1) and (2) and Comparative examples 1 to 3.

TABLE 1

|  | EMBODIMENT | | | | | | COMPARATIVE EXAMPLE | | |
| --- | --- | --- | --- | --- | --- | --- | --- | --- | --- |
|  | 1 | 2 | 3 | 4 | 5 | 6 | 1 | 2 | 3 |
| GRATING PERIOD Λ | 50 | 100 | 10 | 40 | 50 | 50 | 130 | 130 | 50 |
| GRATING THICKNESS d | 45 | 60 | 40 | 40 | 80 | 60 | 130 | 60 | 20 |
| METAL GRATING WIDTH w | 31 | 54 | 7.5 | 28 | 23 | 22.5 | 62.4 | 62.4 | 29 |
| REFRACTIVE INDEX OF INTER-GRATING PORTION $n_a$ | 1 | 1 | 1 | 1 | 1.5 | 1.46 | 1 | 1 | 1 |
| FILLING FACTOR FF | 0.62 | 0.54 | 0.75 | 0.70 | 0.46 | 0.45 | 0.48 | 0.48 | 0.58 |
| REFRACTIVE INDEX OF PRISM $n_p$ | 1.52 | 1.52 | 1.52 | 1.80 | 1.52 | 1.52 | 1.52 | 1.52 | 1.52 |
| LOWER LIMIT OF CONDITION (1) $(1.4n_a - 2.9)\Lambda/\lambda_g - 0.57n_a + 1.32$ | 0.614 | 0.477 | 0.723 | 0.641 | 0.392 | 0.410 | 0.395 | 0.395 | 0.614 |
| UPPER LIMIT OF CONDITION (1) $(1.4n_a - 2.9)\Lambda/\lambda_g - 0.57n_a + 1.39$ | 0.684 | 0.547 | 0.793 | 0.711 | 0.462 | 0.480 | 0.465 | 0.465 | 0.684 |
| LOWER LIMIT OF CONDITION (2) $0.152n_p - 1.375(\Lambda/\lambda_g) + 0.5$ | 0.606 | 0.481 | 0.706 | 0.674 | — | — | 0.406 | 0.406 | 0.606 |
| UPPER LIMIT OF CONDITION (2) $0.152n_p - 1.375(\Lambda/\lambda_g) + 0.6$ | 0.706 | 0.581 | 0.806 | 0.774 | — | — | 0.506 | 0.506 | 0.706 |

Although Embodiments 1 to 6 have described the case where the azimuth of the entering beam defined by the one-dimensional grating structure of the polarization beam splitting element is 0°, the effect of improving the polarization splitting performance can be obtained even when the azimuth is an angle other than 0°.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-077067, filed on Mar. 31, 2011 which is hereby incorporated by reference herein in its entirety.

What is claimed is:

1. A polarization beam splitting element configured to split an entering beam in a visible wavelength range according to polarization directions, the element comprising:

a one-dimensional grating structure having a grating period smaller than a wavelength of the entering beam and including a grating portion formed of a metal; and two light-transmissive members each having a refractive index higher than that of air and each being formed of a light-transmissive material, wherein the one-dimensional grating structure is disposed between the two light-transmissive members, wherein the grating period of the one-dimensional grating structure is 120 nm or less, a thickness of the one-dimensional grating structure is 100 nm or less and an inter-grating portion of the one-dimensional grating structure is formed as a vacuum space or formed of air or a dielectric material, and wherein the grating period Λ [nm], a filling factor FF that is a ratio w/Λ of a width w [nm] of the grating portion to the grating period, a refractive index $n_a$ of the inter-grating portion and a wavelength $\lambda_g$ of 550 [nm] satisfy the following conditions:

$$(1.4n_a - 2.9)\Lambda/\lambda_g - 0.57n_a + 1.32 \leq FF \leq (1.4n_a - 2.9)\Lambda/\lambda_g - 0.57n_a + 1.39$$

$$0.152n_p - 1.375(\Lambda/\lambda_g) + 0.5 \leq FF \leq 0.152n_p - 1.375(\Lambda/\lambda_g) + 0.6.$$

2. A polarization beam splitting element according to claim 1, wherein the inter-grating portion is formed as the vacuum space or formed of the air, and wherein the filling factor FF and a refractive index $n_p$ of the light-transmissive material satisfy the following condition:

$$0.152n_p - 1.375(\Lambda/\lambda_g) + 0.5 \leq FF \leq 0.152n_p - 1.375(\Lambda/\lambda_g) + 0.6.$$

3. A polarization beam splitting element according to claim 1, wherein the metal is aluminum.

4. A polarization beam splitting element according to claim 1, wherein the thickness of the one-dimensional grating structure is 30 nm or more.

5. An image projection apparatus comprising:

a color separation optical system configured to separate light from a light source into plural color lights;

plural light modulation elements configured to respectively modulate the color lights; and a projection optical system configured to project the color lights from the light modulation elements onto a projection surface, wherein the color separation optical system includes a polarization beam splitting element configured to split an entering beam in a visible wavelength range, as the light from the light source, according to polarization directions, the polarization beam splitting element comprising:

a one-dimensional grating structure having a grating period smaller than a wavelength of the entering beam and including a grating portion formed of a metal; and two light-transmissive members each having a refractive index higher than that of air and each being formed of a light-transmissive material, wherein the one-dimensional grating structure is disposed between the two light-transmissive members, wherein the grating period of the one-dimensional grating structure is 120 nm or less, a thickness of the one-dimensional grating structure is 100 nm or less and an inter-grating portion of the one-dimensional grating structure is formed as a vacuum space or formed of air or a dielectric material, and wherein the grating period Λ [nm], a filling factor FF that is a ratio w/Λ of a width w [nm] of the grating portion to the grating period, a refractive index $n_a$ of the inter-grating portion and a wavelength $\lambda_g$ of 550 [nm] satisfy the following conditions:

$$(1.4n_a-2.9)\Lambda/\lambda_g-0.57n_a+1.32 \leq FF \leq (1.4n_a-2.9)\Lambda/\lambda_g-0.57n_a+1.39$$

$$0.152n_p-1.375(\Lambda/\lambda_g)+0.5 \leq FF \leq 0.152n_p-1.375(\Lambda/\lambda_g)+0.6.$$

6. An image projection apparatus comprising:

a first light modulation element, a second light modulation element and a third light modulation element;

a color separation/combination optical system configured to separate light from a light source into a first color light, a second color light and a third color light to introduce the first color light, the second color light and the third color light respectively to the first light modulation element, the second light modulation element and the third light modulation element, and configured to combine the first color light modulated by the first light modulation element, the second color light modulated by the second light modulation element and the third color light modulated by the third light modulation element with one another; and a projection optical system configured to project the combined first, second and third lights from the color separation/combination optical system onto a projection surface, wherein the color separation/combination optical system includes:

a color separating element configured to separate the light from the light source into (a) the first color light and (b) the second and third color lights;

a wavelength selective phase difference plate configured to rotate a polarization direction of one of the second and third color lights by 90° without rotating a polarization direction of the other of the second and third color lights;

a first polarization beam splitting element configured to introduce the first color light to the first light modulation element;

a second polarization beam splitting element configured to introduce the second color light from the wavelength selective phase difference plate to the second light modulation element and introduce the third color light from the wavelength selective phase difference plate to the third light modulation element; and a color combining element configured to combine the first, second and third color lights respectively modulated by the first, second and third light modulation elements, wherein at least the second polarization beam splitting element is configured to split an entering beam in a visible wavelength range, as the second and third color lights, according to polarization directions, the polarization beam splitting element comprising:

a one-dimensional grating structure having a grating period smaller than a wavelength of the entering beam and including a grating portion formed of a metal; and two light-transmissive members each having a refractive index higher than that of air and each being formed of a light-transmissive material, wherein the one-dimensional grating structure is disposed between the two light-transmissive members, wherein the grating period of the one-dimensional grating structure is 120 nm or less, a thickness of the one-dimensional grating structure is 100 nm or less and an inter-grating portion of the one-dimensional grating structure is formed as a vacuum space or formed of air or a dielectric material, and wherein the grating period Λ [nm], a filling factor FF that is a ratio w/Λ of a width w [nm] of the grating portion to the grating period, a refractive index $n_a$ of the inter-grating portion and a wavelength $\lambda_g$ of 550 [nm] satisfy the following conditions:

$$(1.4n_a-2.9)\Lambda/\lambda_g-0.57n_a+1.32 \leq FF \leq (1.4n_a-2.9)\Lambda/\lambda_g-0.57n_a+1.39$$

$$0.152n_p-1.375(\Lambda/\lambda_g)+0.5 \leq FF \leq 0.152n_p-1.375(\Lambda/\lambda_g)+0.6.$$

* * * * *